United States Patent [19]

Stefan et al.

[11] 4,221,511

[45] Sep. 9, 1980

[54] CARBIDE CUTTING TOOL

[75] Inventors: Larry S. Stefan, Houston; Clarence A. Dearing, Jr., Alvin; Frank R. Raney, South Houston, all of Tex.

[73] Assignee: Strade Corporation, Houston, Tex.

[21] Appl. No.: 965,492

[22] Filed: Dec. 1, 1978

[51] Int. Cl.³ .............................................. B26D 1/00
[52] U.S. Cl. ..................................... 407/117; 407/119
[58] Field of Search ................. 407/117, 119, 102, 85, 407/86, 87

[56] References Cited

U.S. PATENT DOCUMENTS

| | | | |
|---|---|---|---|
| 1,973,428 | 11/1933 | Comstock | 407/119 |
| 2,391,133 | 12/1945 | Cole | 407/117 |
| 2,502,922 | 4/1950 | Bura | 407/117 |
| 2,846,756 | 8/1958 | Novkov | 407/117 |
| 3,384,945 | 5/1968 | Kujawiak et al. | 407/117 |
| 3,455,001 | 7/1969 | Sirola | 407/117 |
| 3,482,295 | 12/1969 | Trent | 407/119 |
| 3,646,649 | 3/1972 | Oaks et al. | 407/117 |
| 3,871,092 | 3/1975 | Anschutz et al. | 407/119 |

Primary Examiner—Harrison L. Hinson
Attorney, Agent, or Firm—Arnold, White & Durkee

[57] ABSTRACT

Disclosed is a cutting tool constructed entirely of a carbide material. The cutting tool is designed such that the front face is beveled to form a cutting edge along a top front end of the tool. Elongated sides of the tool between top and bottom surfaces converge along two different axes so as to converge in directions away from the cutting edge. This converging design provides the cutting edge at the widest portion of the tool even after the tool has been used and sharpened repeatedly.

6 Claims, 3 Drawing Figures

U.S. Patent     Sep. 9, 1980     4,221,511
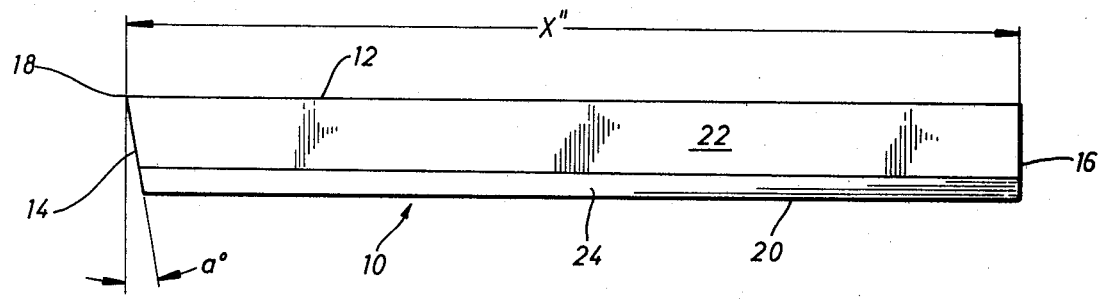
FIG. 1
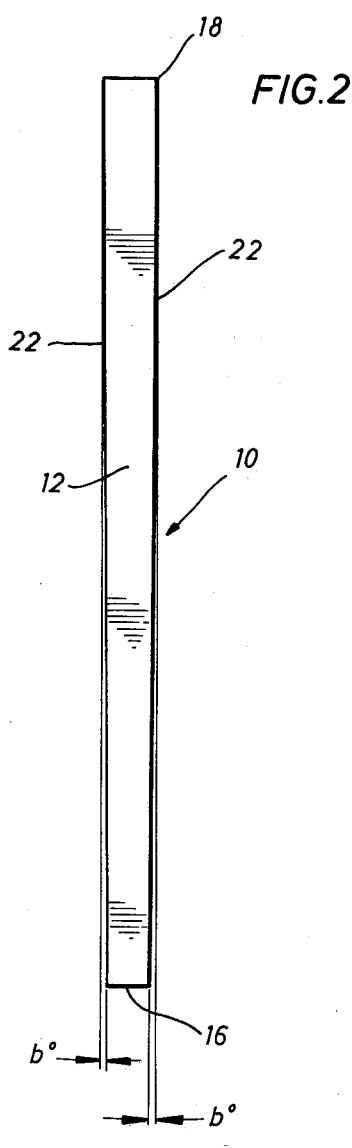
FIG. 2
FIG. 3

CARBIDE CUTTING TOOL

BACKGROUND OF THE INVENTION

This invention relates generally to cutting tools for cutting metal stock. More particularly, the invention relates to a cut-off blade having a one-piece construction of a carbide material.

Cut-off blades or cutting tools may be used in turret lathes, in engine lathes and in other automatic lathes for cutting bulk stock material such as stainless-steel.

One-piece constructed cut-off blades consisting of a cobalt material are currently available for machine tooling. An example of the single piece cobalt cutting tool is the Mo-Max or Mo-max cobalt tool, manufactured by the Cleveland Co., Cleveland, Ohio. The Mo-Max cutting tool features a single piece cobalt construction with the front and/or rear face beveled at 10°. The Mo-max cobalt tool also features converging sides making the configuration of the tool substantially V-shaped. However, these one piece constructions are typically used for cutting softer metals than those which can be cut by the present invention.

Cutting tools currently in use and including carbide for cutting relatively hard metal stock combine a steel shank with a relatively small carbide cutting tip brazed to one end of the steel shank. This construction has exhibited several serious shortcomings. For example, the heat of brazing apparently changes the temper or grade of the carbide and may cause the carbide to crack. Further, brazing provides somewhat of a weak joint between the two materials, this permitting the carbide to vibrate, which may result in chipping. Also, manufacturing the cutting tool in two parts and then joining those two parts together in a brazing operation drives the cost of the device up and provides a greater chance of error in the finished product.

A further disadvantage of the two-piece carbide tip, steel shaft construction is the limited life of the cutting tool. This limited life may result in a variety of ways. First, the carbide tip can only be trimmed back approximately ½ inch and this inherently limits its cutting capabilities. Second, the brazing joint may fail and thereby enable the carbide insert to break away from the shaft. Third, the shaft portion supporting the insert may completely shear or seriously bend. All three of these conditions render the cutting tool inoperable and risk the danger of the steel shank tearing against the metal stock, thereby causing serious damage to the stock.

Accordingly, the prior art devices exhibit many shortcomings which have heretofore remained unsolved.

SUMMARY OF THE INVENTION

The present invention overcomes these prior art deficiencies through a cutting tool having an elongated body consisting entirely of carbide. The carbide cutting tool is constructed so as to have a beveled front face combined with a top locking surface to provide for a wide cutting edge. Side surfaces are provided to converge with a bottom surface and further to converge toward a terminal face.

In the preferred embodiment, alignment surfaces may converge on the bottom surface so as to form a substantially V-shaped surface.

The carbide body in the most preferred embodiment consists essentially of the following composition by weight: tungsten carbide 71.6%, cobalt 8.5%, tantalum carbide 11.9%, and titanium carbide 8.0%. Naturally, these percentages may be varied within metallurgical limits to adjust the metal characteristics as desired.

The present invention therefore provides numerous advantages over the prior art, particularly over the two-piece carbide insert metal shank tool. For example, the present invention extends the life of a carbide cutting tool beyond any forseeable expectations. Applicants have tested the present invention and have found that a dozen cutting tools may be used in a one month period in a cutting plant whereas as many as 300 of the prior art two-piece construction have been previously used in a one month period. Further, the present invention enables increased production over the prior art devices because this invention enables greater surface cutting speeds. Additionally, the one-piece construction of this invention provides a sturdy, chip resistant structure and has unexpectedly exhibited longer cutting periods between grindings than in the prior art constructions. All these advantages collectively reduce the overall cost of the carbide-type cutting tools, because of the greater tool life and because of reduced machine down time as a direct result of the greater tool longevity.

These and other advantages and meritorious features will be more fully appreciated from the following detailed description, the drawings, and the claims.

BRIEF DESCRIPTION OF THE DRAWINGS

FIG. 1 is a side elevational view of a cutting tool in accordance with the present invention;

FIG. 2 is a top view of a cutting tool in accordance with the present invention; and FIG. 3 is an enlarged front elevational view of a cutting tool in accordance with the present invention.

DETAILED DESCRIPTION OF THE PREFERRED EMBODIMENT

A cutting tool as taught by the present invention has its primary use in metal removal operations such as turning, facing, rough boring, profiling, milling, chamfering and cut-off. Although use of a carbide cutting tool tip is standard on many existing cutting tools, use of a carbide material for the total construction of the cutting tool has not previously been used apparently since carbide has a tendency to crack under significant pressure. However, tests have shown that the carbide body will hold up under clamping pressure from the wedge lock on a holding mechanism for a cutting tool.

Referring now to the figures and more particularly to FIG. 1 where an elongated cutting tool 10 is illustrated. The cutting tool 10 has top planar locking surface 12 extending from a beveled front face 14 to a terminal face 16. The locking surface 12 is utilized to hold the elongated body 10 in a cut-off and grooving tool holder (not shown). A tool holder used for machine tooling may be the 100 series holders manufactured by Beco Tool, Inc., Denton, Texas. The Beco tool holder has a wedge lock to hold the cutting tool or cut-off blade body. This wedge lock will provide a positive holding force along the locking surface 12 of the cutting tool. If premature tool failure, such as shearing or chipping, occurs, the cutting tool 10 may be advanced in the tool holder, after grinding and sharpening, so long as there is enough of the locking surface left to cooperate with the wedge lock for holding the tool in place.

The cutting tool 10 may have a length X in the range of 3 to 8 inches, as desired. The front face 14 is beveled at an angle a° to provide a large cutting edge 18. The beveled angle a° may be 7°, for example. The cutting tool 10 is also provided with a bottom face 20 and side surfaces 22 shown in more detail in FIGS. 2 and 3 described hereinbelow.

Referring now to FIGS. 2 and 3, the side surfaces 22 converge not only toward the terminal face 16 but also toward the bottom surface 20. The convergence angle of the side surfaces 22 from the cutting edge 18 to the terminal face 16 is illustrated as angle 6. The convergence angle may be 1½°, for example. Similarly, in FIG. 3 the converging side surfaces 22 are shown to have a convergence angle c° with respect to the bottom surface 20. This convergence angle may be 3° for example. As a result of the side surfaces 22 converging in two directions, the cutting edge 18 will always be the widest edge on the tool no matter how far the carbide material is cut back after grinding and sharpening.

The cutting tool 10 has a height Z, which may be on the order of, for example, 5/16 of an inch. The cutting edge 18 may initially have a width Y of approximately 3/16 of an inch.

As shown in FIG. 3, the surfaces 22 may blend into alignment surfaces 24 which converge at an angle d° ending to form a substantially V-shaped section. This severe angle of convergence d° may be on the order of 45°. As a result of this severe convergence of the alignment surfaces 22 the bottom surface 20 is reduced in size to a dimensional y which is on the order of 1/32 of an inch.

The cutting tool 10 is comprised of a carbide material such as the carbide material manufactured by Teledyne Firth Sterling, McKeesport, Pennsylvania. The Teledyne carbide composition includes by weight approximately 71.6% tungsten carbide, 8.5% cobalt, 11.9% tantalum, and 8% titanium carbide. This grade of carbide exhibits a high temperature hardness for very rough machining and also exhibits good resistance to shock and impact for interrupted-type machining conditions.

Of course, the specific percentages of these ingredients may be varied within metallurgical limits as desired to achieve the cutting and hardness characteristics desired. For example, the ingredients may be included within the following percentage ranges, by weight: tungsten carbide 62%–82%; cobalt 0%–18%; tantalum carbide 2%–21%; and titanium carbide 0%–18%.

Manufacturing of the cutting tool 10 illustrated in FIGS. 1–3 and described above, is accomplished by grinding the tool from carbide stock as provided by Teledyne Firth Sterling, or casting the tool from a predesign mold using carbide powder.

Operationally the cutting tool 10 may be utilized in substantially the same manner and for the same purpose as a carbide tip tool. However, utilizing the cutting tool 10 made substantially of a carbide composition for machine tooling enhances the cutting life of the tool since premature fractures will not render the tool inoperable as a tool with a carbide tip brazed to a steel shank.

What is claimed is:

1. A cutting tool comprising:
   an elongated body having;
   an elongated essentially planar top locking surface for receiving pressure applied by a holder for a cutting operation,
   a front face beveled so as to form a cutting edge at an intersecting line between said locking surface and said front face, the front face having an initial height on the order of about 5/16 inch and an initial width on the order of about 3/16 inch,
   an exposed, bottom surface located in opposed parallel relationship to said top locking surface,
   an exposed, terminal face disposed between said locking surface and said bottom surface and in opposed relationship to said front face,
   first and second side surfaces disposed between said locking surface and said bottom surface and extending from said front face to said terminal face so as to converge toward both said terminal face and said bottom face such that the cutting edge is the widest portion of the cutting tool, wherein the side surfaces each converge toward said bottom surface at an angle of about 3° with a line perpendicular to the top locking surface, wherein the exposed terminal face is essentially perpendicular to the top locking surface, and wherein the side surfaces each converge toward the terminal face at an angle of about 1-½° with a line perpendicular to the terminal face, and
   the first and second side surfaces blending into a pair of respective alignment surfaces which converge toward the bottom surface to form a substantially V-shaped surface,
   the entirety of the cutting tool consisting essentially of a carbide material.

2. The cutting tool as set forth in claim 1 wherein said front face is beveled at an angle of about 7° from a line perpendicular to said top locking surface.

3. A cutting tool as set forth in claim 1 wherein said elongated body consists of a tungsten carbide material.

4. A cutting tool as set forth in claim 1 wherein said carbide material includes by weight approximately 71.6% tungsten carbide, approximately 8.5% cobalt, approximately 11.9% tantalum carbide, and approximately 8.0% titanium carbide.

5. A cutting tool as defined in claim 4, characterized by said front face being beveled at an angle of about 7° from a line perpendicular to said top locking surface.

6. A cutting tool as defined in claim 1, wherein said carbide material includes the following ingredients within the following percentage ranges, by weight: tungsten carbide 62%–82%; cobalt 0%–18%; tantalum carbide 2%–21%; and titanium carbide 0%–18%.

* * * * *